(12) United States Patent
Preis et al.

(10) Patent No.: US 7,481,044 B2
(45) Date of Patent: Jan. 27, 2009

(54) METHOD FOR OPERATION OF AN INTERNAL COMBUSTION ENGINE RUNNING ON HYDROGEN

(75) Inventors: Michael Preis, Koenigsbrunn (DE); Joachim Bettendorf, Munich (DE); Bernhard Staar, Gauting (DE); Juergen Ringler, Kissing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/224,942

(22) Filed: Sep. 14, 2005

(65) Prior Publication Data

US 2006/0000456 A1 Jan. 5, 2006

(30) Foreign Application Priority Data

May 14, 2003 (DE) ................. 103 21 793

(51) Int. Cl.
*F01N 3/00* (2006.01)
(52) U.S. Cl. .................. 60/286; 60/274; 60/280; 60/285; 180/65.2; 180/65.3; 180/65.4
(58) Field of Classification Search .................. 60/274, 60/284, 285, 286, 280; 180/65.1, 65.2, 65.3, 180/65.4
See application file for complete search history.

(56) References Cited

U.S. PATENT DOCUMENTS

| 5,271,359 | A | | 12/1993 | Teramoto et al. |
| 6,079,204 | A | * | 6/2000 | Sun et al. ...................... 60/274 |
| 6,210,641 | B1 | | 4/2001 | Yamada et al. |
| 6,220,019 | B1 | * | 4/2001 | Sugiura et al. ................ 60/285 |
| 6,421,599 | B1 | * | 7/2002 | Lippa et al. .................. 701/102 |
| 6,570,265 | B1 | * | 5/2003 | Shiraishi et al. ........... 290/40 C |
| 7,111,452 | B2 | * | 9/2006 | Miyoshi et al. ............... 60/285 |
| 2002/0166515 | A1 | | 11/2002 | Ancimer et al. |

FOREIGN PATENT DOCUMENTS

| DE | 195 26 319 A1 | 1/1997 |
| DE | 197 47 222 C1 | 3/1999 |
| EP | 0 754 844 A1 | 1/1997 |

OTHER PUBLICATIONS

International Search Report dated Aug. 16, 2004.

* cited by examiner

*Primary Examiner*—Binh Q. Tran
(74) *Attorney, Agent, or Firm*—Crowell & Moring LLP

(57) ABSTRACT

A method is provided for operating a bivalent internal combustion engine, which may run lean with using a fuel with wide inflammability limits, such as hydrogen, whereby a first lean region close to the stoichiometric air ratio and a second lean region, adjacent to the first in the direction of greater $\lambda$ valve are defined. The operation in the first lean region is skipped such that operation occurs either in the second lean region or at an approximately stoichiometric air ratio.

26 Claims, 2 Drawing Sheets

METHOD FOR OPERATION OF AN INTERNAL COMBUSTION ENGINE RUNNING ON HYDROGEN

BACKGROUND AND SUMMARY OF THE INVENTION

This application is a continuation of International Patent Application No. PCT/EP2004/003867 filed on Apr. 13, 2004, designating the United States of America, the entire disclosure of which is incorporated herein by reference. Priority is claimed based on German Patent Application No. DE 103 21793.2 filed May 14, 2003.

This invention relates to a method for operating a bivalent internal combustion engine which can be operated under lean conditions at $\lambda>1$ using a fuel having wide ignition limits such as hydrogen ($H_2$). A first lean range adjacent to the stoichiometric air ratio ($\lambda=1$) is defined and a second lean range following this first range in the direction of larger $\lambda$ values is also defined.

Internal combustion engines, in particular hydrogen-operated internal combustion engines, can be operated under extremely lean conditions at air ratios far higher than $\lambda=2$ over a wide power range, so the level of nitrogen oxide emissions is negligible. Even the crude exhaust has significantly lower concentrations of nitrogen oxides ($NO_x$) in such a hydrogen-based operation in comparison with emissions of a hydrocarbon-based process following aftertreatment of the exhaust using a $\lambda$-controlled three-way catalyst. Only if a relatively high power output is required it is necessary to make the fuel-air mixture richer in the range of $1 \leq \lambda \leq 2$, which then is associated with a drastic increase in $NO_x$ emissions and thus the need for aftertreatment of the exhaust.

Unthrottled and lean operation of the internal combustion engine over a wide power range offers definite advantages in terms of fuel consumption because efficiency is improved with a greater air excess and unthrottled operation.

To prevent problematical $NO_x$ emissions in the lean range close to $\lambda=1$, DE 195 26 319 A1, proposes always operating with an air ratio of $\lambda<1$ and passing the exhaust over a catalytic converter. This approach cannot be regarded as leading to the goal because the special advantage of engine operation that is extremely favorable from the standpoint of consumption with negligible $NO_x$ emissions at the same time is not utilized in the extremely lean range of $\lambda>2$.

In the case of bivalent internal combustion engines in particular, which can be operated with both hydrogen and hydrocarbons such as gasoline, diesel or natural gas, it is recommended that the exhaust aftertreatment technology required for hydrocarbon operation of the internal combustion engine also be used for hydrogen operation.

The conventional catalytic exhaust aftertreatment method with hydrocarbon-operated internal combustion engines includes three-way catalytic converters and/or $NO_x$ storage catalytic converters. It is a disadvantage here that the $\lambda$-controlled three-way catalyst converter is effectively capable of reduction of nitrogen oxide in principle only at a stoichiometric air ratio of $\lambda=1$. In the lean range at $\lambda>1$, its nitrogen oxide reduction behavior is negligible, so that use for lean concepts is out of focus. However, the reduction behavior of $NO_x$ storage catalytic converters, which can be used in principle with an excess of oxygen in the exhaust ($\lambda \geq 1$), is definitely inferior to that of three-way catalytic converters at a stoichiometric air ratio, so this technology is not adequate to take into account extremely high demands with regard to fulfilling extremely stringent exhaust emission regulations.

Therefore, the object of this invention is to provide a method for operating an internal combustion engine, in particular a bivalent engine, with hydrogen, whereby excess $NO_x$ emissions are effectively prevented even when a high power is demanded.

This object is achieved whereby according to the basic idea, the engine is operated essentially in the second lean range—not directly adjacent to the stoichiometric air ratio $\lambda=1$—or at an air ratio that is at least approximately stoichiometric ($\lambda\approx1$). The first lean range adjacent to the stoichiometric air ratio ($\lambda=1$) is faded out so no operation in this range is provided.

Especially preferred refinements and embodiments of the inventive method are the subject of the dependent claims.

It is regarded as highly advantageous if the first lean range includes essentially air ratios ($\lambda$) with significant nitrogen oxide emissions ($NO_x$ emissions) and the second lean range includes essentially air ratios ($\lambda$) with negligible $NO_x$ emissions.

Expediently the first lean range is skipped through an appropriate design of the engine control, which also contains the formation of the fuel-air mixture, by increasing the supply of fuel and/or throttling and/or varying the rate of recirculated exhaust gas. Advantageously the use of exhaust gas recirculation offers the possibility of at least largely unthrottled engine operation with a corresponding efficiency advantage.

According to an especially preferred embodiment of the invention, the internal combustion engine is operated over a wide power range in the second lean range with an especially large $\lambda$, but when a very high power is demanded in particular, the internal combustion engine is operated at least approximately at a stoichiometric air ratio ($\lambda\approx1$), with a sudden transition to the at least approximately stoichiometric air ratio ($\lambda\approx1$) starting from the second lean range, thus skipping the first lean range.

It is very advantageous if there is a catalytic exhaust aftertreatment, in particular when operating at $\lambda\approx1$, expediently using a three-way catalytic converter and/or an $NO_x$ storage catalytic converter.

In particular when using an $NO_x$ storage catalytic converter, rich operation at $\lambda<1$ is recommended at least briefly, depending on the storage capacity and/or loading of the $NO_x$ storage catalytic converter, for regeneration of same.

The nitrogen oxides ($NO_x$) are preferably reduced by means of unburned hydrogen ($H_2$) present in the exhaust.

An especially preferred exemplary embodiment of this invention is illustrated and described in greater detail below with reference to the figures, which show schematically and as an example.

DETAILED DESCRIPTION OF THE DRAWINGS

Figure 1:
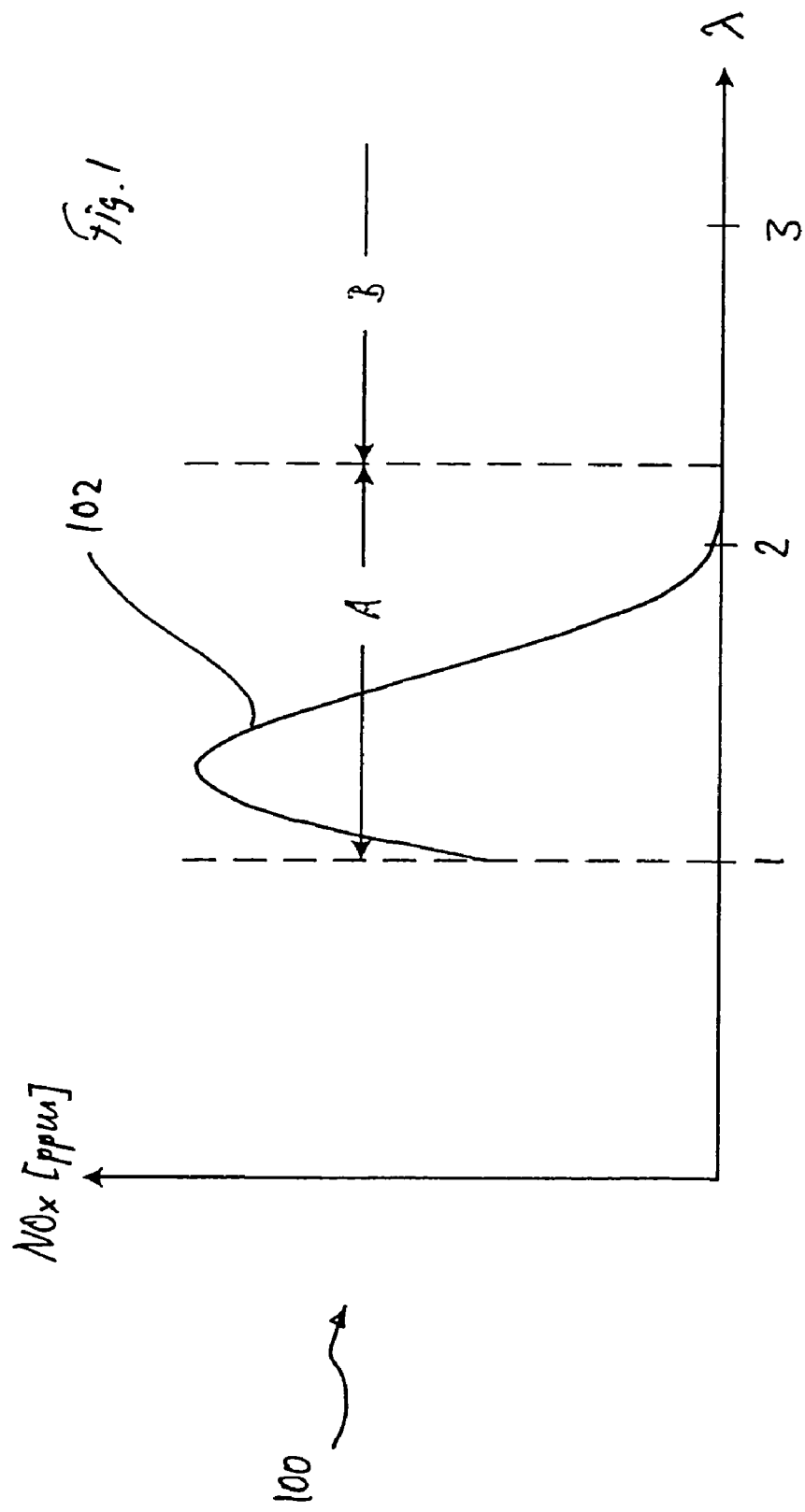
FIG. 1 shows an $NO_x$ concentration curve as a function of the air ratio $\lambda$.

FIG. 1 is based on a bivalent internal combustion engine which can be operated with a fuel containing hydrocarbons, e.g., gasoline, diesel or natural gas or with hydrogen, with the formation of the mixture taking place inside and/or outside the combustion chamber. In addition to a conventional fuel tank for a hydrocarbon-based fuel, a cryotank to accommodate cryogenic liquid hydrogen is also provided on board the vehicle (not shown here). The vehicle includes in particular a $\lambda$-control three-way catalyst converter and/or an $NO_x$ storage catalytic converter for exhaust aftertreatment, in particular with regard to nitrogen oxides ($NO_x$) in the exhaust line. The $\lambda$-controlled three-way catalyst also reduces $NO_x$ emissions at a stoichiometric air ratio of $\lambda=1$ in addition to reducing CO and HC emissions when engine is operated with hydrocarbons. The $NO_x$ storage catalyst is also effective at $\lambda \neq 1$ and stores $NO_x$ in lean operation at $\lambda \geq 1$, whereas regeneration of the $NO_x$ storage catalyst takes place during operating phases with a fuel excess at $\lambda \leq 1$. Unburned hydrogen present in the exhaust supports the reduction of $NO_x$.

Diagram 100 shows qualitatively an $NO_x$ concentration curve 102 for an internal combustion engine operated with hydrogen as a function of the air ratio $\lambda$ in the lean range for $\lambda>1$. Based on a stoichiometric air ratio of $\lambda=1$, the $NO_x$ emissions increase with an increase in the air excess until reaching a maximum value at an air ratio of $\lambda \approx 1.1$ to 1.3. If the air ratio $\lambda$ increases further, the $NO_x$ emissions decline, reaching negligible values in the range of $\lambda \approx 1.8$ to 2.5. This first lean range adjacent to the stoichiometric air ratio $\lambda=1$ is labeled as A. The other lean range which is characterized by negligible $NO_x$ emissions is labeled as B.

Figure 2:
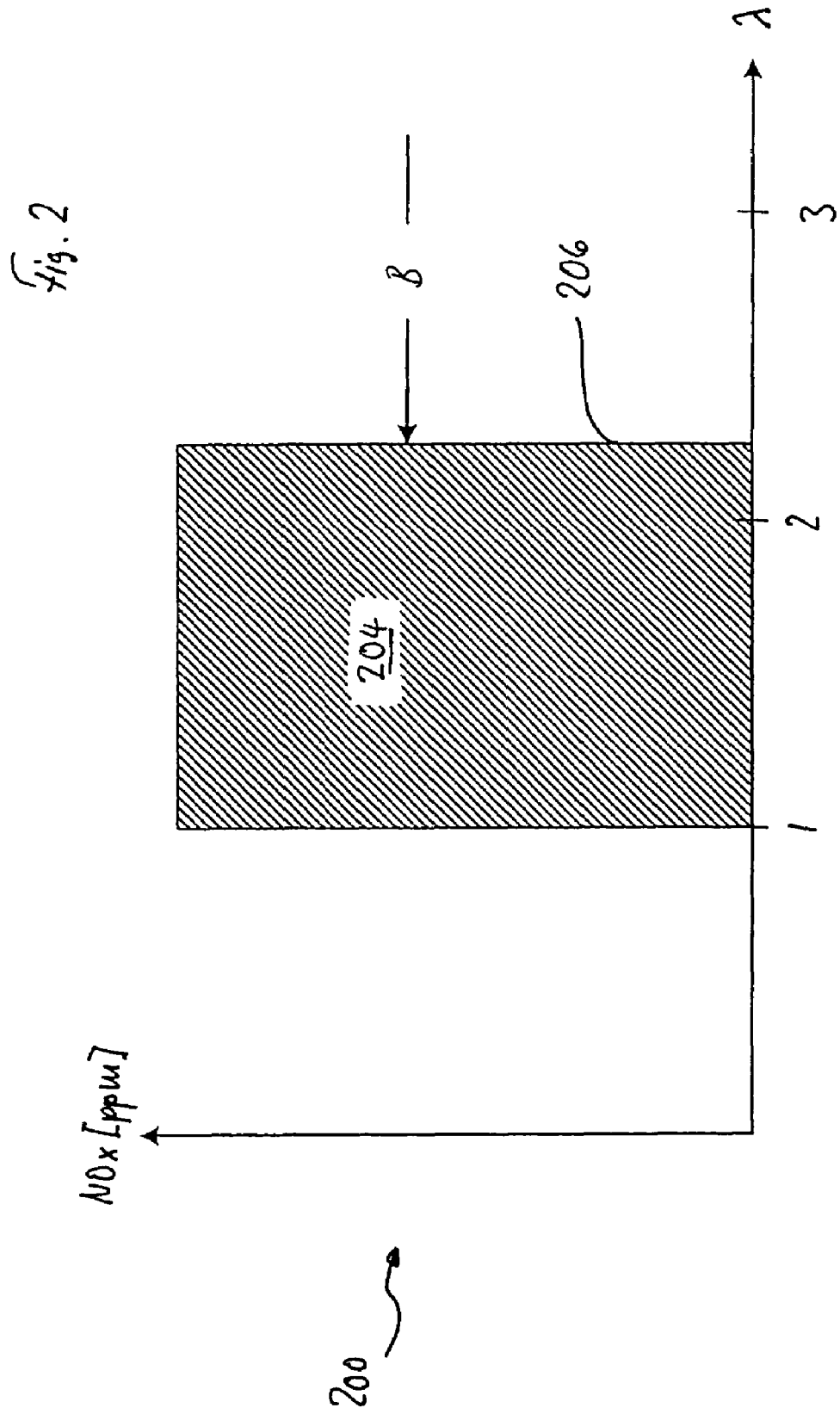
FIG. 2 shows a diagram of operation according to this invention with fade-out of the first lean range adjacent to the stoichiometric air ratio $\lambda=1$.

Operation in range B is possible over a wide power range. Only in the top power range is it necessary to make the mixture richer in the direction of $\lambda=1$. To minimize $NO_x$ emissions even when a high power is demanded, operation conforms to diagram 200, which is shown in FIG. 2 and illustrates the skipping of the first lean range 204 adjacent to the stoichiometric air ratio $\lambda=1$.

Starting from operation in range B, the mixture is suddenly made richer up to $\lambda=1$ when a particularly high power is required, whereupon the regulated three-way catalytic converter becomes operative. The first lean range 204 is faded out; no operation is provided in this range 204. The limit 206 for the sudden change, marking the lower end of the second lean range B, is independent of the particular $NO_x$ limits to be maintained; in the present case the sudden-change limit 206 is in the range of $1.8 \leq \lambda \leq 2.5$. The sudden-change limit 206 may be fixed or may be variable depending on boundary conditions. When using an $NO_x$ storage catalyst, the sharpness of the sudden-change limit may advantageously be blurred to simplify engine management and to expand the unthrottled lean range where consumption is favorable.

In particular when an $NO_x$ storage catalyst is used for the exhaust aftertreatment, the mixture is suddenly made more rich to $\lambda \leq 1$ starting from operation in range B when there is a particularly high power demand, depending on the storage capacity and/or load status of the $NO_x$ storage catalyst converter, so that regeneration of the loaded $NO_x$ storage catalyst can take place if necessary. After successful regeneration, operation of the engine is continued at an at least approximately stoichiometric air ratio ($\lambda 26\ 1$) as long as an especially great power is demanded.

What is claimed is:

1. Method for operating a bivalent internal combustion engine using a fuel with broad ignition limits, whereby a first lean range adjacent to a stoichiometric air ratio ($\lambda=1$) and a second lean range following the first lean range in a direction of larger $\lambda$ values are defined, the method comprising the acts of: skipping operation of the engine in the first lean range while operating the engine at least between the second lean range and at approximately the stoichiometric air ratio ($\lambda \approx 1$) throughout operation of the engine, wherein the fuel is hydrogen.

2. Method as claimed in claim 1, wherein the first lean range essentially includes air ratios ($\lambda$) with significant nitrogen oxide emissions and the second lean range essentially includes air ratios ($\lambda$) with negligible $NO_x$ emissions.

3. Method as claimed in claim 1, wherein the first lean range is skipped via engine control.

4. Method as claimed in claim 2, wherein the first lean range is skipped via engine control.

5. Method as claimed in claim 1, wherein the internal combustion engine is operated in the second lean range over a wide power range.

6. Method as claimed in claim 4, wherein the internal combustion engine is operated in the second lean range over a wide power range.

7. Method as claimed in claim 1, wherein the internal combustion engine is operated at approximately the stoichiometric air ratio ($\lambda \approx 1$) when there are great power demands, whereby starting from the second lean range there is a sudden transition to the approximately stoichiometric air ratio ($\lambda \approx 1$).

8. Method as claimed in claim 4, wherein the internal combustion engine is operated at approximately the stoichiometric air ratio ($\lambda \approx 1$) when there are great power demands, whereby starting from the second lean range there is a sudden transition to the approximately stoichiometric air ratio ($\lambda \approx 1$).

9. Method as claimed in claim 5, wherein the internal combustion engine is operated at approximately the stoichiometric air ratio ($\lambda \approx 1$) when there are great power demands, whereby starting from the second lean range there is a sudden transition to the approximately stoichiometric air ratio ($\lambda \approx 1$).

10. Method as claimed in claim 7, wherein the transition to the approximately stoichiometric air ratio ($\lambda \approx 1$) is accomplished by at least one of an increased fuel supply, an increased exhaust recycling rate, and a reduced air supply.

11. Method as claimed in claim 8, wherein the transition to the approximately stoichiometric air ratio ($\lambda \approx 1$) is accomplished by at least one of an increased fuel supply, an increased exhaust recycling rate, and a reduced air supply.

12. Method as claimed in claim 7, wherein an exhaust aftertreatment is performed using a catalytic converter in particular in operation at $\lambda \approx 1$.

13. Method as claimed in claim 8, wherein an exhaust aftertreatment is performed using a catalytic converter in particular in operation at $\lambda \approx 1$.

14. Method as claimed in claim 9, wherein an exhaust aftertreatment is performed using a catalytic converter in particular in operation at $\lambda \approx 1$.

15. Method as claimed in claim 12, wherein the catalytic converter includes a three-way catalyst converter, an $NO_x$ storage catalyst, or a combination thereof.

16. Method as claimed in claim 13, wherein the catalytic converter includes a three-way catalyst converter, an $NO_x$ storage catalyst, or a combination thereof.

17. Method as claimed in claim 14, wherein the catalytic converter includes a three-way catalyst converter, an $NO_x$ storage catalyst, or a combination thereof.

18. Method as claimed in claim 12, wherein the engine is operated in a rich range at $\lambda \leq 1$, when using an $NO_x$ storage catalyst, depending at least briefly on at least one of a storage capacity and a loading of the $NO_x$ storage catalyst.

19. Method as claimed in claim 13, wherein the engine is operated in a rich range at $\lambda \leq 1$, when using an $NO_x$ storage catalyst, depending at least briefly on at least one of a storage capacity and a loading of the $NO_x$ storage catalyst.

20. Method as claimed in claim 12, wherein nitrogen oxides ($NO_x$) are reduced by means of unburned hydrogen ($H_2$) present in the exhaust.

21. Method as claimed in claim 13, wherein nitrogen oxides ($NO_x$) are reduced by means of unburned hydrogen ($H_2$) present in the exhaust.

22. Method as claimed in claim 18, wherein nitrogen oxides ($NO_x$) are reduced by means of unburned hydrogen ($H_2$) present in the exhaust.

23. Method as claimed in claim 19, wherein nitrogen oxides ($NO_x$) are reduced by means of unburned hydrogen ($H_2$) present in the exhaust.

24. Method as claimed in claim 1, wherein $\lambda$ is greater than 1.3 in the second lean range.

25. Method as claimed in claim 1, wherein $\lambda$ is greater than 1.8 in the second lean range.

26. Method as claimed in claim 7, wherein $\lambda$ is between 1.8 and 2.5 at the sudden transition to the approximately stoichiometric air ratio ($\lambda \approx 1$).

* * * * *